US010053371B2

(12) United States Patent
Fan et al.

(10) Patent No.: US 10,053,371 B2
(45) Date of Patent: Aug. 21, 2018

(54) SYSTEM AND METHOD FOR PREPARING HIGH-PURITY VANADIUM PENTOXIDE POWDER

(71) Applicants: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

(72) Inventors: Chuanlin Fan, Beijing (CN); Qingshan Zhu, Beijing (CN); Wenheng Mu, Beijing (CN); Jibin Liu, Beijing (CN); Cunhu Wang, Beijing (CN); Qixun Ban, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/547,076

(22) PCT Filed: Jan. 28, 2016

(86) PCT No.: PCT/CN2016/072517
§ 371 (c)(1),
(2) Date: Jul. 28, 2017

(87) PCT Pub. No.: WO2016/119716
PCT Pub. Date: Aug. 4, 2016

(65) Prior Publication Data
US 2018/0022616 A1    Jan. 25, 2018

(30) Foreign Application Priority Data

Jan. 30, 2015  (CN) .......................... 2015 1 0052262

(51) Int. Cl.
$C01G\ 31/00$ (2006.01)
$C01G\ 31/02$ (2006.01)
(Continued)

(52) U.S. Cl.
CPC ............... C01G 31/02 (2013.01); B01D 3/02 (2013.01); B01D 3/14 (2013.01); B01J 6/001 (2013.01);
(Continued)

(58) Field of Classification Search
CPC ........ C01G 31/02; C01G 31/04; B01J 8/1827; B01J 8/1836; B01J 8/0055; B01J 19/06;
(Continued)

(56) References Cited

U.S. PATENT DOCUMENTS

2018/0002190 A1* 1/2018 Zhu .................... C01G 31/02
2018/0009673 A1* 1/2018 Zhu .................... C01B 21/0617
(Continued)

FOREIGN PATENT DOCUMENTS

CN      1843938 A    10/2006
CN    101845552 A     9/2010
(Continued)

OTHER PUBLICATIONS

Robert E. McCarley et al., The Preparation of High Purity Vanadium Pentoxide by a Chlorination Procedure, Journal of the Less-Common Metals, No. 2, Apr. 30, 1960 (Apr. 30, 1960), ISSN: 0022-508, pp. 29-35.

*Primary Examiner* — Steven J Bos
(74) *Attorney, Agent, or Firm* — Gokalp Bayramoglu (57) ABSTRACT

The present invention provides a system and method for preparing high-purity vanadium pentoxide powder. Indus-
(Continued)

trial grade vanadium pentoxide is converted to vanadium oxytrichloride by low temperature fluidizing chlorination, wherein chlorinating gas is preheated via heat exchange between fluidizing gas and chlorination flue gas, and an appropriate amount of air is added to enable a part of carbon powder to combust so as to achieve a balanced heat supply during the chlorination, thereby increasing the efficiency of chlorination and ensuring good selectivity in low temperature chlorination. The vanadium oxytrichloride is subjected to purification by rectification, ammonium salt precipitation and fluidized calcination, thereby obtaining high-purity vanadium pentoxide, wherein the ammonia gas produced during calcination is condensed and then recycled for ammonium salt precipitation. The system and method have advantages of favorable adaptability to raw material, less pollution, low energy consumption in production, low operation cost, stable product quality, etc.

8 Claims, 1 Drawing Sheet (51) Int. Cl.
 *B01J 8/18* (2006.01)
 *B01J 8/00* (2006.01)
 *B01J 19/06* (2006.01)
 *B01J 19/24* (2006.01)
 *B01D 3/02* (2006.01)
 *B01D 3/14* (2006.01)
 *B01J 6/00* (2006.01)

(52) U.S. Cl.
 CPC ............ *B01J 8/0055* (2013.01); *B01J 8/1827* (2013.01); *B01J 8/1836* (2013.01); *B01J 19/06* (2013.01); *B01J 19/245* (2013.01); *C01G 31/003* (2013.01); *B01J 2208/00752* (2013.01); *B01J 2208/00761* (2013.01); *C01P 2006/80* (2013.01)

(58) Field of Classification Search
 CPC ............ B01J 19/245; B01J 6/001; B01D 3/02; B01D 3/14
 USPC ........................ 423/62, 67, 463, 472, 594.17
 See application file for complete search history.

(56) References Cited

U.S. PATENT DOCUMENTS

2018/0009674 A1* 1/2018 Zhu .................... C01G 31/02
2018/0009675 A1* 1/2018 Fan .................... C01G 31/02

FOREIGN PATENT DOCUMENTS

| CN | 102181635 A | 9/2011 |
|---|---|---|
| CN | 102234117 A | 11/2011 |
| CN | 102730757 A | 10/2012 |
| CN | 102923775 A | 2/2013 |
| CN | 103130279 A | 6/2013 |
| CN | 103145187 A | 6/2013 |
| CN | 103194603 A | 7/2013 |
| CN | 103515642 A | 1/2014 |
| CN | 103606694 A | 2/2014 |
| CN | 103663557 A | 3/2014 |
| CN | 103787414 A | 5/2014 |
| CN | 103922403 A | 7/2014 |
| EP | 0161977 B1 | 7/1988 |
| EP | 0713257 B1 | 2/2002 |
| RU | 2175990 C1 | 11/2001 |

* cited by examiner

SYSTEM AND METHOD FOR PREPARING HIGH-PURITY VANADIUM PENTOXIDE POWDER

CROSS REFERENCE TO RELATED APPLICATIONS

This application is the national phase entry of International Application No. PCT/CN2016/072517, filed on Jan. 28, 2016, which is based upon and claims priority to Chinese Patent Application No. CN201510052262.7, filed on Jan. 30, 2015, the entire contents of which are incorporated herein by reference.

TECHNICAL FIELD

The present invention relates to the fields of chemical engineering and materials, and more particularly to a system and method for preparing high-purity vanadium pentoxide powder.

BACKGROUND OF THE INVENTION

Vanadium pentoxide is one of the important industrial vanadium products, and widely applied in the production of alloy additives such as ferrovanadium and vanadium nitride, and in the fields of catalysts, colorants, cemented carbide additives and the like. With the continuous development of new energy technologies, there is a growing demand on high-purity vanadium pentoxide (with a purity of above 3N5) in the battery industry, including an all-vanadium redox flow battery (VRB) with good large-scale energy storage performance, a vanadate-based lithium-ion battery used for electric automobiles and the like. However, in general, only vanadium pentoxide with a purity of 2N5 (i.e. the product according with the specification in HGT 3485-2003) can be prepared by the existing industrial technology, which is difficult to meet requirements on vanadium pentoxide for the battery industry. Therefore, how to prepare high-purity vanadium pentoxide with low cost and high efficiency is one of the urgent issues needed to be solved in the field of new energy technologies.

At present, high-purity vanadium pentoxide powder is usually obtained by the following method: a vanadium-leaching solution or a vanadium solution which is obtained by dissolving a vanadium-rich material (such as ammonium polyorthovanadate, ammonium metavanadate, industrial grade vanadium pentoxide, etc.) is used as a raw material, and purified by the method such as chemical precipitation purification and/or solvent extraction/ion resin exchange or the like, to obtain a purified vanadium solution; the purified vanadium solution is subjected to ammonium salt precipitation to obtain the purified ammonium polyorthovanadate or ammonium metavanadate precipitate; then, the precipitate is subjected to decomposition by calcination to obtain the high-purity vanadium pentoxide powder, as described in Chinese Patent Applications CN1843938A, CN102730757A, CN103145187A, CN103515642A, CN103194603A, CN103787414A, CN102181635A and CN103663557A, European Patent EP0713257B1, etc. In these methods, the process parameter for impurity removal is closely related to the content of the impurity in the raw material, thus the adaptability to the raw material is poor. Moreover, the calcium salt and magnesium salt scavengers or extractants, the acid and alkali reagents and ammonium salts for vanadium precipitation used in the purification process are also liable to introduce impurities. In order to improve the quality of the product, it is usually required to use expensive reagents with high purity, thereby leading to the following problems: the cost is too high, large-scale production cannot be implemented and the purity of the product is difficult to stabilize at above 3N5.

For the problems that the scavengers or extractants are liable to introduce impurities and the cost of the reagents used is too high, the relevant agencies also propose the use of the repeated precipitation method to achieve purification and impurity removal of a vanadium solution; that is, by using the ammonium salt precipitation characteristic of the vanadium-containing solution, vanadium is selectively precipitated out, to confine a part of the impurity ions to the solution after precipitation; the resulting ammonium salt precipitate is dissolved and then multiple repeated operations are conducted, to obtain more pure ammonium polyorthovanadate or ammonium metavanadate precipitate; and the precipitate is subjected to decomposition by calcination to obtain a high-purity vanadium pentoxide powder, as described in Chinese Patent Applications CN103606694A, CN102923775A, etc. This process effectively reduces the amount of the reagents used and the possibility that the reagents introduce impurities. However, the dissolution-precipitation process still requires use of a large quantity of high-purity acid and alkali reagents and ammonium salts, therefore the cost of purification is still high; and the cumbersome multiple precipitation operations not only lower the production efficiency but also lead to a significant decline in the direct recovery rate of vanadium. In addition, in the above-mentioned solution purification methods, extraction/back extraction, precipitation, washing and other operation steps will produce a large amount of waste water mainly containing a small quantity of vanadium ions and ammonium ions and a large amount of sodium salts, which results in difficult treatment and outstanding problem of pollution and also seriously restricts the large-scale industrial application of the methods.

Due to the large difference in the boiling points and saturated vapor pressures of metal chlorides, different metal chlorides are easily separated by distillation/rectification. Raw material chlorination—purification by rectification—subsequent treatment is a commonly-used preparation process for high-purity materials such as high-purity silicon (polysilicon), high-purity silicon dioxide, and the like. Because of a very large difference between boiling points of the chloride of vanadium, vanadium oxytrichloride, and the chlorides of common impurities such as iron, calcium, magnesium, aluminum, sodium, potassium and the like, high-purity vanadium oxytrichloride is easily obtained by rectification, and high-purity vanadium pentoxide can be prepared by subjecting the high-purity vanadium oxytrichloride to hydrolysis and ammonium salt precipitation, supplemented by calcination. Therefore, the use of the chlorination method for the preparation of high-purity vanadium pentoxide has a greater advantage in principle. In fact, the use of the chlorination method for the preparation of high-purity vanadium pentoxide is not only feasible in principle, but also has been implemented in the laboratory by the researchers of Iowa State University in the United States as early as the 1960s (Journal of the Less-Common Metals, 1960, 2: 29-35). They employed ammonium polyorthovanadate as a raw material, and prepared the crude vanadium oxytrichloride by chlorination with addition of carbon, then obtained high-purity vanadium oxytrichloride through purification by distillation, and conducted ammonium salt precipitation to obtain high-purity ammonium metavanadate, and finally calcined high-purity ammonium metavanadate at 500-600°

C., to obtain the high-purity vanadium pentoxide powder. However, the study only realizes the intermittent preparation of high-purity vanadium pentoxide by the chlorination method with the laboratory equipment, and cannot provide related information on how to use the chlorination method for continuous preparation of high-purity vanadium pentoxide on an industrial scale. It may be for exactly this reason that the report on continuous preparation of high-purity vanadium pentoxide by the chlorination method is difficult to find in the decades after the study.

Recently, Chinese Patent Application CN103130279A proposes a method for preparing high-purity vanadium pentoxide by using the chlorination method with a vanadium-iron magnetic iron ore, vanadium slag, vanadium-containing catalyst and other materials containing vanadium as raw materials. A mixture of chlorides of vanadium is obtained through chlorination with addition of carbon—dust removal—condensing, and vanadium tetrachloride is separated through rectification to obtain pure vanadium oxytrichloride, then the vanadium oxytrichloride is fed into an ultrapure aqueous solution or ultrapure aqueous solution of ammonia and precipitated, and the precipitate is filtered, dried and calcined to obtain vanadium pentoxide. This patent has the following deficiencies: (1) similar to the above study of Iowa State University in the United States, this patent actually provides the basic flow of chlorination only, lacking the specific operable solutions. For example, the method of chlorination comprises both boiling chlorination and molten salt chlorination, which are completely different methods of chlorination. For another example, concerning the chlorination reactor, it is proposed to use reactors such as "rotary kiln, fluidized furnace, boiling furnace, shaft furnace, multi-hearth furnace" and the like, which actually covers almost all of the commonly-used mainstream reactors in the metallurgical industry; however, different reactors' requirements for raw materials differ greatly. For example, the shaft furnace can only handle "coarse" particles with a particle size more than 8 mm, and needs to conduct pelleting and sintering pretreatment when "fine" particles are processed, while boiling chlorination is generally suitable for the treatment of fine particles. Therefore, a particular vanadium raw material cannot be directly applied to rotary kiln, fluidized furnace, boiling furnace, shaft furnace, multi-hearth furnace and other reactors. Moreover, the "fluidized furnace" and "boiling furnace" are essentially the same, just different in names; therefore, since these reactors vary widely in operation mode and condition, the method cannot actually be implemented on the condition that only basic flow is provided. (2) Vanadium oxytrichloride is fed into the ultrapure aqueous solution for hydrolysis. However, because vanadium pentoxide is easily dissolved in the hydrochloric acid solution, the recovery rate of precipitation of vanadium is too low. Moreover, in the hydrochloric acid solution with an HCl concentration more than 6.0 mol/L, when vanadium pentoxide is dissolved, it will be reduced to $VOCl_2$ and chlorine gas is released, which will further reduce the recovery rate of precipitation of vanadium. Precipitation and washing processes will inevitably produce a large amount of hydrochloric acid solution containing vanadium, and it is difficult to effectively achieve a comprehensive treatment.

In addition, for large-scale industrial applications, there still exists the following two problems in the existing technologies for chlorination of vanadium raw materials: (1) calcination for chlorination of vanadium raw materials is a strong exothermic process, and in addition to preheating the solid and gas reaction materials, the heat generated by the chlorination reaction still needs to be removed by furnace wall heat dissipation to stabilize the temperature in the chlorination; therefore, both the solid and gas are usually enters the reactor at a temperature of near room temperature, and only can participate in the reaction after been preheated by the heat produced from the chlorination reaction, resulting in too low efficiency of reaction in part of the chlorination reactor; (2) since the heat produced by the chlorination reaction needs to be removed through dissipation of a large amount of heat to maintain the operation temperature, the operating condition and environmental climate change are both liable to cause fluctuations in chlorination temperature, resulting in reduction of selectivity in chlorination and efficiency, and it is needed to use a reasonable method for balanced supply of heat and temperature regulation. Therefore, reasonable heat supply and temperature control must be provided. Only in this way, it is possible to effectively improve the efficiency of chlorination and obtain stable chlorination temperature, so as to ensure the selectivity in the chlorination to effectively inhibit the chlorination of impurities.

Therefore, by achieving the regulation of chlorination process, improving the direct recovery rate of vanadium, reducing energy consumption in production, and further avoiding environment pollution caused by ammonia-containing tail gas produced during the calcination of ammonium salt through innovation of the process and technology, the economy of the technology for preparing high-purity vanadium pentoxide through the chlorination method can be improved effectively.

SUMMARY OF THE INVENTION

In view of the above problem, the present invention proposes a system and method for preparing high-purity vanadium pentoxide powder, to ensure good selectivity in low temperature chlorination, improve the calcination decomposition efficiency of the ammonium salt precipitate, avoid the pollution caused by ammonia-containing tail gas, and reduce the energy consumption in the production of high-purity vanadium pentoxide and the operation cost. In order to achieve these objects, the present invention adopts the following technical solutions.

Figure 1:
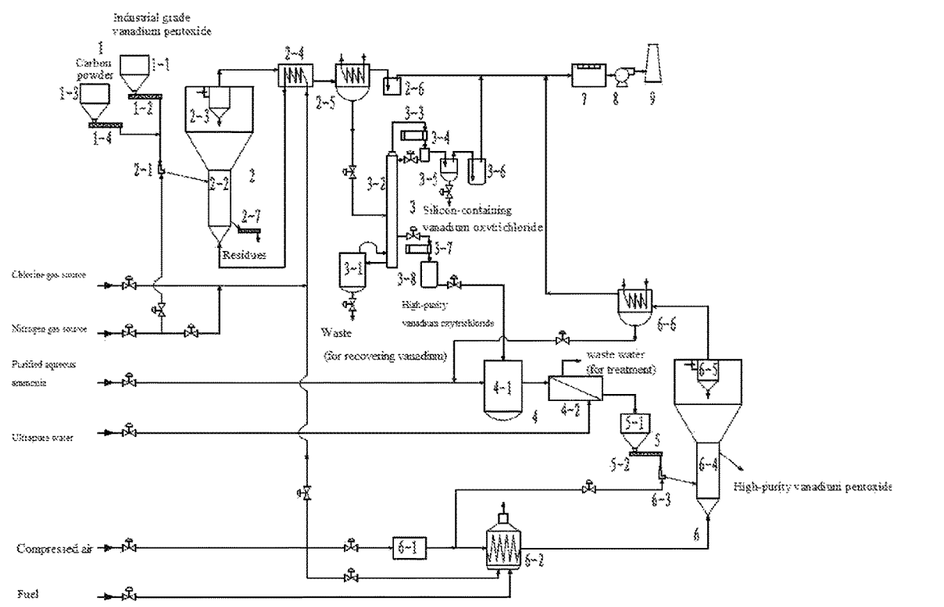
FIG. 1 is a schematic diagram illustrating the configuration of a system for preparing high-purity vanadium pentoxide powder according to the present invention.

The present invention provides a system for preparing high-purity vanadium pentoxide powder, comprising feeding device 1, low temperature chlorination fluidized bed 2, rectification and purification device 3, ammonium salt precipitation device 4, ammonium salt feeding device 5, calcination fluidized bed 6, tail gas washing absorber 7, induced draft fan 8 and chimney 9;

wherein the feeding device 1 comprises industrial grade vanadium pentoxide hopper 1-1, industrial grade vanadium pentoxide screw feeder 1-2, carbon powder hopper 1-3 and carbon powder screw feeder 1-4;

the low temperature chlorination fluidized bed 2 comprises chlorination bed feeder 2-1, chlorination fluidized bed body 2-2, chlorination bed cyclone separator 2-3, flue gas heat exchanger 2-4, flue gas condenser 2-5, chlorination bed acid-seal tank 2-6 and chlorination bed spiral slag-discharging device 2-7;

the rectification and purification device 3 comprises distilling still 3-1, rectifying column 3-2, distillate condenser 3-3, reflux liquid collecting tank 3-4, silicon-containing vanadium oxytrichloride storage tank 3-5, rectification section acid-seal tank 3-6, high-purity vanadium oxytrichloride condenser 3-7, and high-purity vanadium oxytrichloride storage tank 3-8;

the ammonium salt precipitation device 4 comprises ammonium salt precipitation reaction tank 4-1 and washing filter 4-2;

the ammonium salt feeding device 5 comprises ammonium salt hopper 5-1 and ammonium salt screw feeder 5-2;

the calcination fluidized bed 6 comprises an air purifier 6-1, gas heater 6-2, calcination bed feeder 6-3, calcination fluidized bed body 6-4, calcination bed cyclone separator 6-5 and ammonia gas condenser 6-6;

wherein a feed outlet at the bottom of the industrial grade vanadium pentoxide hopper 1-1 is connected with a feed inlet of the industrial grade vanadium pentoxide screw feeder 1-2; a feed outlet at the bottom of the carbon powder hopper 1-3 is connected with a feed inlet of the carbon powder screw feeder 1-4; and a feed outlet of the industrial grade vanadium pentoxide screw feeder 1-2 and a feed outlet of the carbon powder screw feeder 1-4 are both connected with a feed inlet of the chlorination bed feeder 2-1 through a pipeline;

a feed discharge opening of the chlorination bed feeder 2-1 is connected with a feed inlet at the upper part of the chlorination fluidized bed body 2-2 through a pipeline; a gas inlet at the bottom of the chlorination bed feeder 2-1 is connected with a nitrogen gas source main pipe through a pipeline; the chlorination bed cyclone separator 2-3 is provided at the center of the top of the expansion section of the chlorination fluidized bed body 2-2; a gas outlet at the top of the chlorination bed cyclone separator 2-3 is connected with a hot flue gas inlet of the flue gas heat exchanger 2-4 through a pipeline; a cold flue gas outlet of the flue gas heat exchanger 2-4 is connected with a gas inlet of the flue gas condenser 2-5 through a pipeline; a gas outlet of the flue gas condenser 2-5 is connected with a gas inlet of the chlorination bed acid-seal tank 2-6 through a pipeline; a gas outlet of the chlorination bed acid-seal tank 2-6 is connected with a gas inlet of the tail gas washing absorber 7 through a pipeline; a slag-discharge opening at the lower part of the chlorination fluidized bed body 2-2 is connected with a feed inlet of the chlorination bed spiral slag-discharging device 2-7 through a pipeline; a gas inlet at the bottom of the chlorination fluidized bed body 2-2 is connected with a hot gas outlet of the flue gas heat exchanger 2-4 through a pipeline; and a cold gas inlet of the flue gas heat exchanger 2-4 is connected with a chlorine gas source main pipe, the nitrogen gas source main pipe and a compressed air main pipe through pipelines, respectively;

a liquid outlet at the bottom of the flue gas condenser 2-5 is connected with a feed inlet of the rectifying column 3-2 through a pipeline; a steam outlet of the distilling still 3-1 is connected with a steam inlet of the rectifying column 3-2 through a pipeline; a backflow inlet of the distilling still 3-1 is connected with a liquid reflux outlet at the bottom of the rectifying column 3-2 through a pipeline; a gas outlet at the top of the rectifying column 3-2 is connected with a gas inlet of the distillate condenser 3-3 through a pipeline; a liquid outlet of the distillate condenser 3-3 is connected with a liquid inlet of the reflux liquid collecting tank 3-4 through a pipeline; a reflux liquid outlet of the reflux liquid collecting tank 3-4 is connected with a reflux liquid inlet at the top of the rectifying column 3-2 through a pipeline; a feed discharge opening of the reflux liquid collecting tank 3-4 is connected with an inlet of the silicon-containing vanadium oxytrichloride storage tank 3-5 through a pipeline; an exhaust gas outlet of the silicon-containing vanadium oxytrichloride storage tank 3-5 is connected with a gas inlet of the rectification section acid-seal tank 3-6 through a pipeline; a gas outlet of the rectification section acid-seal tank 3-6 is connected with a gas inlet of the tail gas washing absorber 7 through a pipeline; a rectificate outlet of the rectifying column 3-2 is connected with a gas inlet of the high-purity vanadium oxytrichloride condenser 3-7 through a pipeline; a liquid outlet of the high-purity vanadium oxytrichloride condenser 3-7 is connected with a liquid inlet of the high-purity vanadium oxytrichloride storage tank 3-8 through a pipeline; and an underflow outlet is provided at the bottom of the distilling still 3-1;

an ammonia solution inlet of the ammonium salt precipitation reaction tank 4-1 is connected with a purified aqueous ammonia main pipe and an aqueous ammonia outlet at the bottom of the ammonia gas condenser 6-6 through pipelines, respectively; a chloride inlet of the ammonium salt precipitation reaction tank 4-1 is connected with a liquid outlet of the high-purity vanadium oxytrichloride storage tank 3-8 through a pipeline; a slurry outlet of the ammonium salt precipitation reaction tank 4-1 is connected with a slurry inlet of the washing filter 4-2 through a pipeline; a clear water inlet of the washing filter 4-2 is connected with an ultrapure water main pipe through a pipeline; a washing liquid outlet of the washing filter 4-2 is connected with a wastewater treatment unit through a pipeline; and a solid material outlet of the washing filter 4-2 is connected with a feed inlet of the ammonium salt hopper 5-1 through a pipeline;

a feed outlet at the bottom of the ammonium salt hopper 5-1 is connected with a feed inlet of the ammonium salt screw feeder 5-2; and a feed outlet of the ammonium salt screw feeder 5-2 is connected with a feed inlet of the calcination bed feeder 6-3 through a pipeline;

a gas inlet of the air purifier 6-1 is connected with the compressed air main pipe through a pipeline; a gas outlet of the air purifier 6-1 is connected with a gas inlet of the gas heater 6-2 and a gas inlet at the bottom of the calcination bed feeder 6-3 through pipelines, respectively; a combustion-supporting wind inlet of a combustion nozzle and a fuel inlet of the gas heater 6-2 are respectively connected with the compressed air main pipe and a fuel main pipe through pipelines; a gas outlet of the gas heater 6-2 is connected with a gas inlet at the bottom of the calcination fluidized bed body 6-4 through a pipeline; a feed discharge opening of the calcination bed feeder 6-3 is connected with a feed inlet at the lower part of the calcination fluidized bed body 6-4 through a pipeline; a feed outlet at the upper part of the calcination fluidized bed body 6-4 is connected with a high-purity vanadium pentoxide product hopper through a pipeline; the calcination bed cyclone separator 6-5 is provided at the center of the top of the expansion section of the calcination fluidized bed body 6-4; a gas outlet of the calcination bed cyclone separator 6-5 is connected with a gas inlet of the ammonia gas condenser 6-6 through a pipeline; and a gas outlet of the ammonia gas condenser 6-6 is connected with a gas inlet of the tail gas washing absorber 7 through a pipeline;

a gas outlet of the tail gas washing absorber 7 is connected with a gas inlet of the induced draft fan 8 through a pipeline; and a gas outlet of the induced draft fan 8 is connected with a gas inlet at the bottom of the chimney 9 through a pipeline.

The present invention further provides a method for preparing high-purity vanadium pentoxide powder based on the above system, comprising the following steps:

allowing industrial grade vanadium pentoxide powder in the industrial grade vanadium pentoxide hopper 1-1 and carbon powder in the carbon powder hopper 1-3 to enter the chlorination bed feeder 2-1 simultaneously through the industrial grade vanadium pentoxide screw feeder 1-2 and the carbon powder screw feeder 1-4 respectively and be mixed therein, and then enter the chlorination fluidized bed body 2-2; allowing chlorine gas from the chlorine gas source main pipe, nitrogen gas from the nitrogen gas source main pipe and air from the compressed air main pipe to be preheated by exchanging heat with chlorination flue gas by the flue gas heat exchanger 2-4, and then enter the chlorination fluidized bed body 2-2 to allow the vanadium pentoxide and the carbon powder to be kept at a fluidized state and chemically reacted, wherein the air enables a part of the carbon powder to combust to provide heat for maintaining the temperature of the fluid bed, and the chlorine gas and the carbon powder function together to make vanadium pentoxide and a small amount of impurities be chlorinated, to form chlorinated residues and chlorination flue gas rich in vanadium oxytrichloride; discharging the chlorinated residues through the slag-discharge opening at the lower part of the chlorination fluidized bed body 2-2 and the chlorination bed spiral slag-discharging device 2-7; and allowing the chlorination flue gas to be subjected to dust removing by the chlorination bed cyclone separator 2-3 and fall back to the chlorination fluidized bed, and then be precooled by the flue gas heat exchanger 2-4 and enter the flue gas condenser 2-5, such that vanadium oxytrichloride therein is condensed to form a crude vanadium oxytrichloride liquid and the remaining tail gas enters the tail gas washing absorber 7 through the chlorination bed acid-seal tank 2-6;

allowing the crude vanadium oxytrichloride liquid formed by the flue gas condenser 2-5 to enter the rectifying column 3-2 and the distilling still 3-1 to be subjected to rectification operation, to obtain a vanadium-rich waste rich in high-boiling-point impurity, silicon-containing vanadium oxytrichloride vapor rich in low-boiling-point impurities and high-purity vanadium oxytrichloride vapor, wherein the vanadium-rich waste is used for the subsequent recovery of vanadium; condensing the silicon-containing vanadium oxytrichloride vapor into liquid by the distillate condenser 3-3, wherein a part of the liquid returns to the rectifying column 3-2 through the reflux liquid collecting tank 3-4, and the remaining liquid enters the silicon-containing vanadium oxytrichloride storage tank 3-5; transmitting the exhaust gas produced in the silicon-containing vanadium oxytrichloride storage tank 3-5 to the tail gas washing absorber 7 through the rectification section acid-seal tank 3-6, wherein silicon-containing vanadium oxytrichloride can be applied in the field of chemical engineering such as the field of catalysis; and condensing the high-purity vanadium oxytrichloride vapor into liquid by the high-purity vanadium oxytrichloride condenser 3-7 and allowing the liquid to enter the high-purity vanadium oxytrichloride storage tank 3-8;

allowing the high-purity vanadium oxytrichloride liquid in the high-purity vanadium oxytrichloride storage tank 3-8 to enter the ammonium salt precipitation reaction tank 4-1 and then be subjected to hydrolysis precipitation with aqueous ammonia from the purified aqueous ammonia main pipe and the ammonia gas condenser 6-6 to form a mixed slurry containing an ammonium salt precipitate of ammonium polyorthovanadate, ammonium metavanadate and the like mixed with an ammonium chloride solution; and allowing the slurry to enter the washing filter 4-2 and then be washed with ultrapure water and filtered to obtain a washing liquid and ammonium salt precipitate powder, wherein the washing liquid is transmitted to the wastewater treatment unit, and the ammonium salt precipitate is transmitted to the ammonium salt hopper 5-1;

allowing the ammonium salt precipitate in the ammonium salt hopper 5-1 to enter the calcination fluidized bed body 6-4 through the ammonium salt screw feeder 5-2 and the calcination bed feeder 6-3 in turn; allowing compressed air to be purified by the air purifier 6-1 and preheated by the gas heater 6-2 relying on fuel combustion for heat supply in turn and then enter the calcination fluidized bed body 6-4, to keep the ammonium salt precipitate powder material at a fluidized state and subject the powder material to thermal decomposition to form high-purity vanadium pentoxide powder and calcination flue gas rich in ammonia gas and water vapor, wherein the high-purity vanadium pentoxide powder is discharged from the feed discharge opening at the upper part of the calcination fluidized bed body 6-4 and then transmitted to the product hopper for storage, and the calcination flue gas is subjected to dust removing by the calcination bed cyclone separator 6-5 and then enters the ammonia gas condenser 6-6 for recovery by condensation, such that an ammonia solution is obtained and then transmitted to the tail gas washing absorber 7; and transmitting the gas discharged from the tail gas washing absorber 7 to the chimney 9 then to vent through the induced draft fan 8.

The first characteristic of the present invention lies in that: in the chlorination fluidized bed body 2-2, the amount of the carbon powder added in the chlorination process is 10%-20% of the mass of the industrial grade vanadium pentoxide powder; and in the chlorination, the operation temperature is 300-500° C. and the average residence time of the powder is 30-80 min.

The second characteristic of the present invention lies in that: in the rectifying column 3-2, the number of trays in the rectification section is 5-10, and the number of trays in the stripping section is 10-20 in the rectification operation; and in the rectification operation, the reflux ratio (i.e., the ratio of the quantity of reflux at the top of the column to the amount of the discharged material) is kept at 15-40.

The third characteristic of the present invention lies in that: in the ammonium salt precipitation reaction tank 4-1, the operation temperature in the ammonium salt precipitation is 40-85° C., and the pH value for precipitation is 6-9.

The fourth characteristic of the present invention lies in that: in the calcination fluidized bed body 6-4, the operation temperature in the ammonium salt calcination is 400-600° C., and the average residence time of the powder is 45-90 min.

The purity of the high-purity vanadium pentoxide powder prepared by the present invention is above 4N.

Compared with the prior art, the present invention has the following outstanding advantages:

(1) Through heat exchange between the chlorinating gas and the chlorination flue gas, preheating of the chlorinating gas is achieved while the flue gas is cooled, which makes the temperature distribution in the chlorination reactor more uniform, thereby improving the efficiency of low temperature chlorination of vanadium raw material effectively.

(2) By adding an appropriate amount of air to enable a part of carbon powder to combust, a balanced heat supply and temperature regulation during the chlorination are implemented, thereby stabilizing the operation temperature in the chlorination, increasing the efficiency of the chlorination reaction, ensuring good selectivity in the chlorination, and avoiding side reactions such as generation of vanadium tetrachloride.

(3) High-purity vanadium oxytrichloride is precipitated to obtain ammonium salt precipitate, which is then transmitted to the calcination fluidized bed for decomposition by fluidized calcination. The heat required for the calcination process is provided by the gas preheated by the gas heater. Thus, the efficiency of decomposition by calcination and the quality of the product can be improved effectively.

(4) The ammonia solution obtained by condensing and recycling the ammonia-containing tail gas produced during calcination of the ammonium salt is returned to the ammonium salt precipitation step. Therefore, the pollution caused by the ammonia-containing tail gas is avoided while the consumption of the purified aqueous ammonia is reduced.

The present invention has the advantages of favorable adaptability to a raw material, good selectivity in low temperature chlorination, low consumption of aqueous ammonia, low energy consumption in production and low operation cost, stable product quality and so on, and is suitable for the large scale industrial production of the high-purity vanadium pentoxide powder with a purity of above 4N, with good economic and social benefits.

BRIEF DESCRIPTION OF THE DRAWINGS

The accompanying drawing is used to provide further illustration of the present invention and constitutes a part of the specification. It is used to explain the present invention together with the examples of the present invention, rather than limit the present invention.

REFERENCE SIGNS

1 Feeding device
1-1 Industrial grade vanadium pentoxide hopper
1-2 Industrial grade vanadium pentoxide screw feeder
1-3 Carbon powder hopper
1-4 Carbon powder screw feeder
2 Low temperature chlorination fluidized bed
2-1 Chlorination bed feeder
2-2 Chlorination fluidized bed body
2-3 Chlorination bed cyclone separator
2-4 Flue gas heat exchanger
2-5 Flue gas condenser
2-6 Chlorination bed acid-seal tank
2-7 Chlorination bed spiral slag-discharging device
3 Rectification and purification device
3-1 Distilling still
3-2 Rectifying column
3-3 Distillate condenser
3-4 Reflux liquid collecting tank
3-5 Silicon-containing vanadium oxytrichloride storage tank
3-6 Rectification section acid-seal tank
3-7 High-purity vanadium oxytrichloride condenser
3-8 High-purity vanadium oxytrichloride storage tank
4 Ammonium salt precipitation device
4-1 Ammonium salt precipitation reaction tank
4-2 Washing filter
5 Ammonium salt feeding device
5-1 Ammonium salt hopper
5-2 Ammonium salt screw feeder
6 Calcination fluidized bed
6-1 Air purifier
6-2 Gas heater
6-3 Calcination bed feeder
6-4 Calcination fluidized bed body
6-5 Calcination bed cyclone separator
6-6 Ammonia gas condenser
7 Tail gas washing absorber
8 Induced draft fan
9 Chimney

DETAILED DESCRIPTION OF THE INVENTION

In order to make the object, technical solution and advantages of the present invention be clearer, the technical solution in the examples of the present invention will be described clearly and completely below with reference to the accompanying drawing of the examples of the present invention. Obviously, the described examples are only a part of the examples of the present invention, not all examples. It is worth noting that the examples are merely used for illustrating the technical solution of the present invention, rather than limiting the present invention. FIG. 1 is a schematic diagram illustrating a system and method for preparing high-purity vanadium pentoxide powder according to the present invention.

Referring to FIG. 1, the system for preparing high-purity vanadium pentoxide powder used in this example comprises feeding device 1, low temperature chlorination fluidized bed 2, rectification and purification device 3, ammonium salt precipitation device 4, ammonium salt feeding device 5, calcination fluidized bed 6, tail gas washing absorber 7, induced draft fan 8 and chimney 9;

wherein the feeding device 1 comprises industrial grade vanadium pentoxide hopper 1-1, industrial grade vanadium pentoxide screw feeder 1-2, carbon powder hopper 1-3 and carbon powder screw feeder 1-4;

the low temperature chlorination fluidized bed 2 comprises chlorination bed feeder 2-1, chlorination fluidized bed body 2-2, chlorination bed cyclone separator 2-3, flue gas heat exchanger 2-4, flue gas condenser 2-5, chlorination bed acid-seal tank 2-6 and chlorination bed spiral slag-discharging device 2-7;

the rectification and purification device 3 comprises distilling still 3-1, rectifying column 3-2, distillate condenser 3-3, reflux liquid collecting tank 3-4, silicon-containing vanadium oxytrichloride storage tank 3-5, rectification section acid-seal tank 3-6, high-purity vanadium oxytrichloride condenser 3-7, and high-purity vanadium oxytrichloride storage tank 3-8;

the ammonium salt precipitation device 4 comprises ammonium salt precipitation reaction tank 4-1 and washing filter 4-2;

the ammonium salt feeding device 5 comprises ammonium salt hopper 5-1 and ammonium salt screw feeder 5-2;

the calcination fluidized bed 6 comprises air purifier 6-1, gas heater 6-2, calcination bed feeder 6-3, calcination fluidized bed body 6-4, calcination bed cyclone separator 6-5 and ammonia gas condenser 6-6;

wherein a feed outlet at the bottom of the industrial grade vanadium pentoxide hopper 1-1 is connected with a feed inlet of the industrial grade vanadium pentoxide screw feeder 1-2; a feed outlet at the bottom of the carbon powder hopper 1-3 is connected with a feed inlet of the carbon powder screw feeder 1-4; and a feed outlet of the industrial grade vanadium pentoxide screw feeder 1-2 and a feed outlet of the carbon powder screw feeder 1-4 are both connected with a feed inlet of the chlorination bed feeder 2-1 through a pipeline;

a feed discharge opening of the chlorination bed feeder 2-1 is connected with a feed inlet at the upper part of the chlorination fluidized bed body 2-2 through a pipeline; a gas inlet at the bottom of the chlorination bed feeder 2-1 is connected with a nitrogen gas source main pipe through a pipeline; the chlorination bed cyclone separator 2-3 is provided at the center of the top of the expansion section of the chlorination fluidized bed body 2-2; a gas outlet at the top of the chlorination bed cyclone separator 2-3 is connected with a hot flue gas inlet of the flue gas heat exchanger 2-4 through a pipeline; a cold flue gas outlet of the flue gas heat exchanger 2-4 is connected with a gas inlet of the flue gas condenser 2-5 through a pipeline; a gas outlet of the flue gas condenser 2-5 is connected with a gas inlet of the chlorination bed acid-seal tank 2-6 through a pipeline; a gas outlet of the chlorination bed acid-seal tank 2-6 is connected with a gas inlet of the tail gas washing absorber 7 through a pipeline; a slag-discharge opening at the lower part of the chlorination fluidized bed body 2-2 is connected with a feed inlet of the chlorination bed spiral slag-discharging device 2-7 through a pipeline; a gas inlet at the bottom of the chlorination fluidized bed body 2-2 is connected with a hot gas outlet of the flue gas heat exchanger 2-4 through a pipeline; and a cold gas inlet of the flue gas heat exchanger 2-4 is connected with a chlorine gas source main pipe, the nitrogen gas source main pipe and a compressed air main pipe through a pipeline, respectively;

a liquid outlet at the bottom of the flue gas condenser 2-5 is connected with a feed inlet of the rectifying column 3-2 through a pipeline; a steam outlet of the distilling still 3-1 is connected with a steam inlet of the rectifying column 3-2 through a pipeline; a backflow inlet of the distilling still 3-1 is connected with a liquid reflux outlet at the bottom of the rectifying column 3-2 through a pipeline; a gas outlet at the top of the rectifying column 3-2 is connected with a gas inlet of the distillate condenser 3-3 through a pipeline; a liquid outlet of the distillate condenser 3-3 is connected with a liquid inlet of the reflux liquid collecting tank 3-4 through a pipeline; a reflux liquid outlet of the reflux liquid collecting tank 3-4 is connected with a reflux liquid inlet at the top of the rectifying column 3-2 through a pipeline; a feed discharge opening of the reflux liquid collecting tank 3-4 is connected with an inlet of the silicon-containing vanadium oxytrichloride storage tank 3-5 through a pipeline; an exhaust gas outlet of the silicon-containing vanadium oxytrichloride storage tank 3-5 is connected with a gas inlet of the rectification section acid-seal tank 3-6 through a pipeline; a gas outlet of the rectification section acid-seal tank 3-6 is connected with a gas inlet of the tail gas washing absorber 7 through a pipeline; a rectificate outlet of the rectifying column 3-2 is connected with a gas inlet of the high-purity vanadium oxytrichloride condenser 3-7 through a pipeline; a liquid outlet of the high-purity vanadium oxytrichloride condenser 3-7 is connected with a liquid inlet of the high-purity vanadium oxytrichloride storage tank 3-8 through a pipeline; and an underflow outlet is provided at the bottom of the distilling still 3-1;

an ammonia solution inlet of the ammonium salt precipitation reaction tank 4-1 is connected with a purified aqueous ammonia main pipe and an aqueous ammonia outlet at the bottom of the ammonia gas condenser 6-6 through pipelines, respectively; a chloride inlet of the ammonium salt precipitation reaction tank 4-1 is connected with a liquid outlet of the high-purity vanadium oxytrichloride storage tank 3-8 through a pipeline; a slurry outlet of the ammonium salt precipitation reaction tank 4-1 is connected with a slurry inlet of the washing filter 4-2 through a pipeline; a clear water inlet of the washing filter 4-2 is connected with an ultrapure water main pipe through a pipeline; a washing liquid outlet of the washing filter 4-2 is connected with a wastewater treatment unit through a pipeline; and a solid material outlet of the washing filter 4-2 is connected with a feed inlet of the ammonium salt hopper 5-1 through a pipeline;

a feed outlet at the bottom of the ammonium salt hopper 5-1 is connected with a feed inlet of the ammonium salt screw feeder 5-2; and a feed outlet of the ammonium salt screw feeder 5-2 is connected with a feed inlet of the calcination bed feeder 6-3 through a pipeline;

a gas inlet of the air purifier 6-1 is connected with the compressed air main pipe through a pipeline; a gas outlet of the air purifier 6-1 is connected with a gas inlet of the gas heater 6-2 and a gas inlet at the bottom of the calcination bed feeder 6-3 through pipelines, respectively; a combustion-supporting wind inlet of a combustion nozzle and a fuel inlet of the gas heater 6-2 are respectively connected with the compressed air main pipe and a fuel main pipe through pipelines; a gas outlet of the gas heater 6-2 is connected with a gas inlet at the bottom of the calcination fluidized bed body 6-4 through a pipeline; a feed discharge opening of the calcination bed feeder 6-3 is connected with a feed inlet at the lower part of the calcination fluidized bed body 6-4 through a pipeline; a feed outlet at the upper part of the calcination fluidized bed body 6-4 is connected with a high-purity vanadium pentoxide product hopper through a pipeline; the calcination bed cyclone separator 6-5 is provided at the center of the top of the expansion section of the calcination fluidized bed body 6-4; a gas outlet of the calcination bed cyclone separator 6-5 is connected with a gas inlet of the ammonia gas condenser 6-6 through a pipeline; and a gas outlet of the ammonia gas condenser 6-6 is connected with a gas inlet of the tail gas washing absorber 7 through a pipeline;

a gas outlet of the tail gas washing absorber 7 is connected with a gas inlet of the induced draft fan 8 through a pipeline; and a gas outlet of the induced draft fan 8 is connected with a gas inlet at the bottom of the chimney 9 through a pipeline.

The above system is used in this example to prepare high-purity vanadium pentoxide powder. The specific method comprises the following steps. Industrial grade vanadium pentoxide powder in the industrial grade vanadium pentoxide hopper 1-1 and carbon powder in the carbon powder hopper 1-3 enter the chlorination bed feeder 2-1 simultaneously through the industrial grade vanadium pentoxide screw feeder 1-2 and the carbon powder screw feeder 1-4 respectively and are mixed therein, and then enter the chlorination fluidized bed body 2-2; chlorine gas from the chlorine gas source main pipe, nitrogen gas from the nitrogen gas source main pipe and air from the compressed air main pipe are preheated by exchanging heat with chlorination flue gas by the flue gas heat exchanger 2-4, and then enter the chlorination fluidized bed body 2-2 to allow the vanadium pentoxide, the carbon powder and other powder materials at a fluidized state and chemically reacted, wherein the air enables a part of the carbon powder to combust to provide heat for maintaining the temperature of the fluid bed, and the chlorine gas and the carbon powder function together to make vanadium pentoxide and a small amount of impurities be chlorinated, to form chlorinated residues and chlorination flue gas rich in vanadium oxytrichloride; the chlorinated residues are discharged through the slag-discharge opening at the lower part of the chlorination fluidized bed body 2-2 and the chlorination bed spiral slag-discharging device 2-7; and the chlorination flue gas is subjected to dust removing by the chlorination bed cyclone separator 2-3 and falls back to the chlorination fluidized bed, and then is precooled by the flue gas heat exchanger 2-4 and enters the flue gas condenser 2-5, such that vanadium oxytrichloride therein is condensed to form a crude vanadium oxytrichloride liquid and the remaining tail gas enters the tail gas washing absorber 7 through the chlorination bed acid-seal tank 2-6;

the crude vanadium oxytrichloride liquid formed by the flue gas condenser 2-5 enters the rectifying column 3-2 and the distilling still 3-1 in turn to be subjected to rectification operation, to obtain a vanadium-rich waste rich in high-boiling-point impurities, silicon-containing vanadium oxytrichloride vapor rich in low-boiling-point impurities and high-purity vanadium oxytrichloride vapor, wherein the vanadium-rich waste is used for the subsequent recovery of vanadium; the silicon-containing vanadium oxytrichloride vapor is condensed into liquid by the distillate condenser 3-3, wherein a part of the liquid returns to the rectifying column 3-2 through the reflux liquid collecting tank 3-4, and the remaining liquid enters the silicon-containing vanadium oxytrichloride storage tank 3-5; the exhaust gas produced in the silicon-containing vanadium oxytrichloride storage tank 3-5 is transmitted to the tail gas washing absorber 7 through the rectification section acid-seal tank 3-6, wherein the silicon-containing vanadium oxytrichloride can be applied in the field of chemical engineering such as the field of catalysis; and the high-purity vanadium oxytrichloride vapor is condensed into liquid by the high-purity vanadium oxytrichloride condenser 3-7 and then enters the high-purity vanadium oxytrichloride storage tank 3-8;

the high-purity vanadium oxytrichloride liquid in the high-purity vanadium oxytrichloride storage tank 3-8 enters the ammonium salt precipitation reaction tank 4-1 and then is subjected to hydrolysis precipitation with aqueous ammonia from the purified aqueous ammonia main pipe and the ammonia gas condenser 6-6 to form a mixed slurry containing an ammonium salt precipitate of ammonium polyorthovanadate, ammonium metavanadate and the like mixed with an ammonium chloride solution; and the slurry enters the washing filter 4-2 and then is washed with ultrapure water and filtered to obtain a washing liquid and ammonium salt precipitate powder, wherein the washing liquid is transmitted to the wastewater treatment unit, and the ammonium salt precipitate is transmitted to the ammonium salt hopper 5-1;

the ammonium salt precipitate in the ammonium salt hopper 5-1 enters the calcination fluidized bed body 6-4 through the ammonium salt screw feeder 5-2 and the calcination bed feeder 6-3; compressed air is purified by the air purifier 6-1 and preheated by the gas heater 6-2 relying on fuel combustion for heat supply and then enters the calcination fluidized bed body 6-4, to keep the ammonium salt precipitation powder material at a fluidized state and subject the powder material to thermal decomposition to form high-purity vanadium pentoxide powder and calcination flue gas rich in ammonia gas and water vapor, wherein the high-purity vanadium pentoxide powder is discharged from the feed discharge opening at the upper part of the calcination fluidized bed body 6-4 and then transmitted to the product hopper for storage, and the calcination flue gas is subjected to dust removing by the calcination bed cyclone separator 6-5 and then enters the ammonia gas condenser 6-6 for recovery by condensation, such that an ammonia solution is obtained and then transmitted to the tail gas washing absorber 7; and the gas discharged from the tail gas washing absorber 7 is transmitted to the chimney 9 then to vent through the induced draft fan 8.

In this example, the industrial grade vanadium pentoxide powder was used as the raw material and its chemical composition is shown in Table 1. The throughput is 75 kg/h, and the high-purity vanadium pentoxide product was prepared by low temperature chlorination, rectification of vanadium oxytrichloride, ammonium salt precipitation and decomposition by calcination.

TABLE 1

| Chemical composition of the industrial grade vanadium pentoxide raw material used in the example (wt %) | | | | | | | | | |
|---|---|---|---|---|---|---|---|---|---|
| $V_2O_5$ | Si | Ca | Al | Ti | Fe | Mn | Na | K | S |
| 98.8 | 0.0150 | 0.0275 | 0.0099 | 0.0260 | 0.0971 | 0.0293 | 0.1385 | 0.0714 | 0.1274 |

The operation conditions are as follows: in the chlorination fluidized bed body 2-2, the amount of the carbon powder added in the low temperature chlorination process is 20% of the mass of the industrial grade vanadium pentoxide powder, and in the chlorination, the operation temperature is 300° C. and the average residence time of the powder is 80 min; in the rectifying column 3-2, the number of trays in the rectification section is 5, and the number of trays in the stripping section is 10 in the rectification operation, and the reflux ratio of the rectification operation is 40; in the ammonium salt precipitation reaction tank 4-1, the operation temperature in the ammonium salt precipitation is 85° C., and the pH value for precipitation is 6.5; in the calcination fluidized bed body 6-4, the operation temperature in the ammonium salt calcination is 400° C., and the average residence time of the powder is 90 min. Under such operation conditions, the direct recovery rate of vanadium reached 85%, and the purity of the high-purity vanadium pentoxide product reached 99.996 wt % (4N6).

The operation conditions are as follows: in the chlorination fluidized bed body 2-2, the amount of the carbon powder added in the low temperature chlorination process is 10% of the mass of the industrial grade vanadium pentoxide powder, and in the chlorination, the operation temperature is 500° C. and the average residence time of the powder is 30 min; in the rectifying column 3-2, the number of trays in the rectification section is 10, and the number of trays in the stripping section is 20 in the rectification operation, and the reflux ratio of the rectification operation is 15; in the ammonium salt precipitation reaction tank 4-1, the operation temperature in the ammonium salt precipitation is 40° C., and the pH value for precipitation is 9; in the calcination fluidized bed body 6-4, the operation temperature in the ammonium salt calcination is 600° C., and the average residence time of the powder is 45 min. Under such operation conditions, the direct recovery rate of vanadium reached 83%, and the purity of the high-purity vanadium pentoxide product reached 99.9993 wt % (5N3).

The details which are not illustrated in detail in the present invention belong to the well-known technologies in the art.

Of course, the present invention can also provide a variety of examples. According to the disclosure of the present invention, those skilled in the art can make various corresponding changes and transformations without departing from the spirit and essence of the present invention; however, these corresponding changes and transformations shall all fall within the protection scope of the claims of the present invention.

What is claimed is:

1. A system for preparing high-purity vanadium pentoxide powder, comprising a feeding device, a low temperature chlorination fluidized bed, a rectification and purification device, an ammonium salt precipitation device, an ammonium salt feeding device, a calcination fluidized bed, a tail gas washing absorber, an induced draft fan and a chimney;

wherein the feeding device comprises an industrial grade vanadium pentoxide hopper, an industrial grade vanadium pentoxide screw feeder, a carbon powder hopper and a carbon powder screw feeder;

the low temperature chlorination fluidized bed comprises a chlorination bed feeder, a chlorination fluidized bed body, a chlorination bed cyclone separator, a flue gas heat exchanger, a flue gas condenser, a chlorination bed acid-seal tank and a chlorination bed spiral slag-discharging device;

the rectification and purification device comprises a distilling still, a rectifying column, a distillate condenser, a reflux liquid collecting tank, a silicon-containing vanadium oxytrichloride storage tank, a rectification section acid-seal tank, a high-purity vanadium oxytrichloride condenser, and a high-purity vanadium oxytrichloride storage tank;

the ammonium salt precipitation device comprises an ammonium salt precipitation reaction tank and a washing filter;

the ammonium salt feeding device comprises an ammonium salt hopper and an ammonium salt screw feeder;

the calcination fluidized bed comprises an air purifier, a gas heater, a calcination bed feeder, a calcination fluidized bed body, a calcination bed cyclone separator and an ammonia gas condenser;

wherein a feed outlet at the bottom of the industrial grade vanadium pentoxide hopper is connected with a feed inlet of the industrial grade vanadium pentoxide screw feeder; a feed outlet at the bottom of the carbon powder hopper is connected with a feed inlet of the carbon powder screw feeder; and a feed outlet of the industrial grade vanadium pentoxide screw feeder and a feed outlet of the carbon powder screw feeder are both connected with a feed inlet of the chlorination bed feeder through a pipeline;

a feed discharge opening of the chlorination bed feeder is connected with a feed inlet at the upper part of the chlorination fluidized bed body through a pipeline; a gas inlet at the bottom of the chlorination bed feeder is connected with a nitrogen gas source main pipe through a pipeline; the chlorination bed cyclone separator is provided at the center of the top of the expansion section of the chlorination fluidized bed body; a gas outlet at the top of the chlorination bed cyclone separator is connected with a hot flue gas inlet of the flue gas heat exchanger through a pipeline; a cold flue gas outlet of the flue gas heat exchanger is connected with a gas inlet of the flue gas condenser through a pipeline; a gas outlet of the flue gas condenser is connected with a gas inlet of the chlorination bed acid-seal tank through a pipeline; a gas outlet of the chlorination bed acid-seal tank is connected with a gas inlet of the tail gas washing absorber through a pipeline; a slag-discharge opening at the lower part of the chlorination fluidized bed body is connected with a feed inlet of the chlorination bed spiral slag-discharging device through a pipeline; a gas inlet at the bottom of the chlorination fluidized bed body is connected with a hot gas outlet of the flue gas heat exchanger through a pipeline; and a cold gas inlet of the flue gas heat exchanger is connected with a chlorine gas source main pipe, the nitrogen gas source main pipe and a compressed air main pipe through pipelines, respectively;

a liquid outlet at the bottom of the flue gas condenser is connected with a feed inlet of the rectifying column through a pipeline; a steam outlet of the distilling still is connected with a steam inlet of the rectifying column through a pipeline; a backflow inlet of the distilling still is connected with a liquid reflux outlet at the bottom of the rectifying column through a pipeline; a gas outlet at the top of the rectifying column is connected with a gas inlet of the distillate condenser through a pipeline; a liquid outlet of the distillate condenser is connected with a liquid inlet of the reflux liquid collecting tank through a pipeline; a reflux liquid outlet of the reflux liquid collecting tank is connected with a reflux liquid inlet at the top of the rectifying column through a pipeline; a feed discharge opening of the reflux liquid collecting tank is connected with an inlet of the silicon-containing vanadium oxytrichloride storage tank through a pipeline; an exhaust gas outlet of the silicon-containing vanadium oxytrichloride storage tank is connected with a gas inlet of the rectification section acid-seal tank through a pipeline; a gas outlet of the rectification section acid-seal tank is connected with a gas inlet of the tail gas washing absorber through a pipeline; a rectificate outlet of the rectifying column is connected with a gas inlet of the high-purity vanadium oxytrichloride condenser through a pipeline; a liquid outlet of the high-purity vanadium oxytrichloride condenser is connected with a liquid inlet of the high-purity vanadium oxytrichloride storage tank through a pipeline; and an underflow outlet is provided at the bottom of the distilling still;

an ammonia solution inlet of the ammonium salt precipitation reaction tank is connected with a purified aqueous ammonia main pipe and an aqueous ammonia outlet at the bottom of the ammonia gas condenser through pipelines, respectively; a chloride inlet of the ammonium salt precipitation reaction tank is connected with a liquid outlet of the high-purity vanadium oxytrichloride storage tank through a pipeline; a slurry outlet of the ammonium salt precipitation reaction tank is connected with a slurry inlet of the washing filter through a pipeline; a clear water inlet of the washing filter is connected with an ultrapure water main pipe through a pipeline; a washing liquid outlet of the washing filter is connected with a wastewater treatment unit through a pipeline; and a solid material outlet of the washing filter is connected with a feed inlet of the ammonium salt hopper through a pipeline;

a feed outlet at the bottom of the ammonium salt hopper is connected with a feed inlet of the ammonium salt screw feeder; and a feed outlet of the ammonium salt screw feeder is connected with a feed inlet of the calcination bed feeder through a pipeline;

a gas inlet of the air purifier is connected with the compressed air main pipe through a pipeline; a gas outlet of the air purifier is connected with a gas inlet of the gas heater and a gas inlet at the bottom of the calcination bed feeder through pipelines, respectively; a combustion-supporting wind inlet of a combustion nozzle and a fuel inlet of the gas heater are respectively connected with the compressed air main pipe and a fuel main pipe through pipelines; a gas outlet of the gas heater is connected with a gas inlet at the bottom of the calcination fluidized bed body through a pipeline; a feed discharge opening of the calcination bed feeder is connected with a feed inlet at the lower part of the calcination fluidized bed body through a pipeline; a feed outlet at the upper part of the calcination fluidized bed body is connected with a high-purity vanadium pentoxide product hopper through a pipeline; the calcination bed cyclone separator is provided at the center of the top of the expansion section of the calcination fluidized bed body; a gas outlet of the calcination bed cyclone separator is connected with a gas inlet of the ammonia gas condenser through a pipeline; and a gas outlet of the ammonia gas condenser is connected with a gas inlet of the tail gas washing absorber through a pipeline;

a gas outlet of the tail gas washing absorber is connected with a gas inlet of the induced draft fan through a pipeline; and a gas outlet of the induced draft fan is connected with a gas inlet at the bottom of the chimney through a pipeline.

2. A method for preparing high-purity vanadium pentoxide powder using the system of claim 1, comprising the following steps:

introducing industrial grade vanadium pentoxide powder in the industrial grade vanadium pentoxide hopper and carbon powder in the carbon powder hopper to the chlorination bed feeder simultaneously through the industrial grade vanadium pentoxide screw feeder and the carbon powder screw feeder respectively and be mixed therein, and then enter the chlorination fluidized bed body; preheating chlorine gas from the chlorine gas source main pipe, nitrogen gas from the nitrogen gas source main pipe and air from the compressed air main pipe by exchanging heat with chlorination flue gas by the flue gas heat exchanger, and then enter the chlorination fluidized bed body to keep the vanadium pentoxide and the carbon powder at a fluidized state and chemically reacted, wherein the air enables a part of the carbon powder to combust to provide heat for maintaining the temperature of the fluid bed, and the chlorine gas and the carbon powder function together to make vanadium pentoxide and a small amount of impurities be chlorinated, to form chlorinated residues and chlorination flue gas rich in vanadium oxytrichloride; discharging the chlorinated residues through the slag-discharge opening at the lower part of the chlorination fluidized bed body and the chlorination bed spiral slag-discharging device; and subjecting the chlorination flue gas to dust removing by the chlorination bed cyclone separator and fall back to the chlorination fluidized bed, and then be precooled by the flue gas heat exchanger and enter the flue gas condenser, such that vanadium oxytrichloride therein is condensed to form a crude vanadium oxytrichloride liquid and the remaining tail gas enters the tail gas washing absorber through the chlorination bed acid-seal tank;

introducing the crude vanadium oxytrichloride liquid formed by the flue gas condenser to the rectifying column and the distilling still in turn to be subjected to rectification operation, to obtain a vanadium-rich waste rich in high-boiling-point impurities, silicon-containing vanadium oxytrichloride vapor rich in low-boiling-point impurities and high-purity vanadium oxytrichloride vapor; condensing the silicon-containing vanadium oxytrichloride vapor into liquid by the distillate condenser, wherein a part of the liquid returns to the rectifying column through the reflux liquid collecting tank, and the remaining liquid enters the silicon-containing vanadium oxytrichloride storage tank; transmitting the exhaust gas produced in the silicon-containing vanadium oxytrichloride storage tank to the tail gas washing absorber through the rectification section acid-seal tank; and condensing the high-purity vanadium oxytrichloride vapor into liquid by the high-purity vanadium oxytrichloride condenser and introducing the liquid to the high-purity vanadium oxytrichloride storage tank;

introducing the high-purity vanadium oxytrichloride liquid in the high-purity vanadium oxytrichloride storage tank to the ammonium salt precipitation reaction tank and then be subjected to hydrolysis precipitation with aqueous ammonia from the purified aqueous ammonia main pipe and the ammonia gas condenser to form a mixed slurry containing ammonium salt precipitate of ammonium polyorthovanadate and ammonium metavanadate mixed with ammonium chloride solution; and introducing the slurry to the washing filter and then be washed with ultrapure water and filtered to obtain a washing liquid and ammonium salt precipitate powder, wherein the washing liquid is transmitted to the wastewater treatment unit, and the ammonium salt precipitation is transmitted to the ammonium salt hopper;

introducing the ammonium salt precipitate in the ammonium salt hopper to the calcination fluidized bed body through the ammonium salt screw feeder and the calcination bed feeder in turn; precipitate compressed air to be purified by the air purifier and preheated by the gas heater relying on fuel combustion for heat supply in turn and then enters the calcination fluidized bed body, to keep the ammonium salt precipitate powder material at a fluidized state and subject the powder material to thermal decomposition to form high-purity vanadium pentoxide powder and calcination flue gas rich in ammonia gas and water vapor, wherein the high-purity vanadium pentoxide powder is discharged from the feed discharge opening at the upper part of the calcination fluidized bed body and then transmitted to the product hopper for storage, and the calcination flue gas is subjected to dust removing by the calcination bed cyclone separator and then enters the ammonia gas condenser for recovery by condensation, such that an ammonia solution is obtained and then transmitted to the tail gas washing absorber; and transmitting the gas discharged from the tail gas washing absorber to the chimney then to vent through the induced draft fan.

3. The method for preparing high-purity vanadium pentoxide powder according to claim 2, wherein in the chlorination conducted in the chlorination fluidized bed body, the amount of the carbon powder added is 10%-20% of the mass of the industrial grade vanadium pentoxide powder.

4. The method for preparing high-purity vanadium pentoxide powder according to claim 2, wherein in the chlorination fluidized bed body, the operation temperature in the chlorination is 300-500° C. and the average residence time of the powder is 30-80 min.

5. The method for preparing high-purity vanadium pentoxide powder according to claim 2, wherein in the rectifying column, the number of trays in the rectification section is 5-10, and the number of trays in the stripping section is 10-20 in the rectification operation.

6. The method for preparing high-purity vanadium pentoxide powder according to claim 2, wherein the reflux ratio of the rectification operation is 15-40.

7. The method for preparing high-purity vanadium pentoxide powder according to claim 2, wherein in the ammonium salt precipitation reaction tank, the operation temperature in the ammonium salt precipitation is 40-85° C., and the pH value for precipitation is 6-9.

8. The method for preparing high-purity vanadium pentoxide powder according to claim 2, wherein in the calcination fluidized bed body, the operation temperature in the ammonium salt calcination is 400-600° C., and the average residence time of the powder is 45-90 min.

* * * * *